(12) United States Patent
Kratschmer et al.

(10) Patent No.: US 6,646,099 B2
(45) Date of Patent: Nov. 11, 2003

(54) PRODUCTION AND USE OF POLYESTER CARBONATES

(75) Inventors: Silke Kratschmer, Krefeld (DE);
Lothar Bunzel, Kempen (DE);
Wolfgang Alewelt, Krefeld (DE);
Renate Wilms, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/180,351

(22) Filed: Jun. 26, 2002

(65) Prior Publication Data

US 2003/0105272 A1 Jun. 5, 2003

(30) Foreign Application Priority Data

Jun. 28, 2001 (DE) .......................... 101 31 127

(51) Int. Cl.$^7$ ............................................. C08G 64/00
(52) U.S. Cl. .................. 528/196; 528/198; 528/271; 528/272
(58) Field of Search ................. 528/196, 198, 528/271, 272

(56) References Cited

U.S. PATENT DOCUMENTS

| | | | |
|---|---|---|---|
| 3,169,121 A | 2/1965 | Goldberg | 260/47 |
| 4,983,706 A | 1/1991 | Fontana et al. | 528/176 |
| 5,025,081 A | 6/1991 | Fontana et al. | 528/176 |
| 5,274,068 A | 12/1993 | Boden et al. | 528/179 |
| 5,807,965 A | 9/1998 | Davis | 528/196 |
| 6,255,436 B1 * | 7/2001 | Kimura et al. | 528/196 |

FOREIGN PATENT DOCUMENTS

JP 3-203926 9/1991

OTHER PUBLICATIONS

Database Ca Online! Chemical Abstracts Service, Columbus, Ohio, US; Kageyama, Yuichi et al: "Thermally stable aromatic polycarbonates and polyester–polycarbonates and their manufacture" retrieved from STN Database accession No. 133:208352 XP002234677 Zusammenfassung & JP 2000 248057 A (Teijin Ltd., Japan) Sep. 12, 2000.

Database WPI, Section Ch, Week 199517 Derwent Publications Ltd., London, GB; AN 1995–128423, XP002234695 & JP 07 053695 A (Mitsubishi Gas Chem Co Inc.), Feb. 28, 1995 Zusammenfassung.

* cited by examiner

*Primary Examiner*—Terressa M. Boykin
(74) *Attorney, Agent, or Firm*—Joseph C. Gil; Aron Preis

(57) ABSTRACT

A transesterification process for producing polyester is disclosed. In a first stage of the process there is heated, in an inert gas atmosphere, a first mixture containing at least one dihydroxy compound and at least one diaryl carbonate to form an oligocondensate. In a second stage there is added to the oligocondensate at least one dicarboxylic acid to form a second mixture. The second mixture is heated to a temperature not higher than 290° C. in the presence of a quaternary onium compound as catalyst to form polyester carbonate. Hydroxyaryl formed throughout the process is distilled-off under reduced pressure.

12 Claims, No Drawings

PRODUCTION AND USE OF POLYESTER CARBONATES

FIELD OF THE INVENTION

The application relates to polyester carbonate and more particularly to a melt transesterification process for its manufacture.

SUMMARY OF THE INVENTION

A transesterification process for producing polyester is disclosed. In a first stage of the process there is heated, in an inert gas atmosphere, a first mixture containing at least one dihydroxy compound and at least one diaryl carbonate to form an oligocondensate. In a second stage there is added to the oligocondensate at least one dicarboxylic acid to form a second mixture. The second mixture is heated to a temperature not higher than 290° C. in the presence of a quaternary onium compound as catalyst to form polyester carbonate. Hydroxyaryl formed throughout the process is distilled-off under reduced pressure.

BACKGROUND OF THE INVENTION

The production of polyester carbonates from difunctional, aliphatic carboxylic acids and dihydroxy compounds via the interfacial process is described for example in EP-A 433 716, U.S. Pat. No. 4,983,706 and U.S. Pat. No. 5,274,068. As is disclosed in EP-A 433 716, the known carboxylic acids for producing polyester carbonates can however be incorporated in significant amounts only by a complicated and expensive procedure in the interfacial process.

The incorporation of aromatic or aliphatic dicarboxylic acids via the so-called pyridine process is described in U.S. Pat. No. 3,169,121.

The transesterification process is well known for the incorporation of aromatic dicarboxylic acids and is described for example in U.S. Pat. No. 4,459,384. The incorporation of aliphatic dicarboxylic acids is described in JP-A 2000 248 057 although here, as is generally the case, all monomers are added jointly at the start of the reaction and are heated and/or condensed in common.

JP-A 3 203 926 likewise describes a transesterification process for the incorporation of aliphatic dicarboxylic acids. The dicarboxylic acids are in this case reacted with aromatic dihydroxy compounds and dicarbonates, alkali metal or alkaline earth metal compounds being used as catalyst. Apart from the proportion of incorporated dicarboxylic acid, no further details are given concerning possible secondary reactions or the intrinsic color of the polymers that are obtained.

Polyester carbonates that are produced by the interfacial process have a good intrinsic color, but contain minor amounts of anhydrides of the employed dicarboxylic acids or even free acid, which is undesirable. This is described in EP-A 926 177. However, in principle the object is to incorporate the dicarboxylic acids as completely as possible into the polyester carbonate so that as many ester bonds as possible in addition to as few acidic or anhydride structures as possible are present in the product, since these impair the stability of the polyester carbonate.

In contrast to this, although polyester carbonates that have been synthesised by the transesterification process contain few anhydride structures, nevertheless they normally have a strong intrinsic coloration, which in turn has to be as low as possible for most applications.

The object therefore existed of producing a polyester carbonate that on the one hand contains as many ester bonds as possible in addition to as few acidic or anhydride structures as possible, but that nevertheless on the other hand has a good intrinsic color.

DETAILED DESCRIPTION OF THE INVENTION

This object was surprisingly achieved by the transesterification process according to the invention.

The present application accordingly provides a process for the production of polyester carbonates by transesterification of diaryl carbonates with dihydroxy compounds and dicarboxylic acids, characterised in that the condensation is carried out in the presence of quaternary onium compounds as catalysts, wherein the dicarboxylic acids are added only after the oligocondensation of the dihydroxy compounds and the temperature does not exceed 290° C.

Furthermore, the present application also provides the polyester carbonates per se that can be obtained by the process according to the invention.

According to the process of the invention, in a first stage a mixture of dihydroxy compound and diaryl carbonate is heated in an inert gas atmosphere and under reduced pressure for 30 to 300 minutes, preferably for 60 to 150 minutes, up to a temperature of 200 to 290° C., preferably 230 to 290° C., particularly preferably 250° to 280° C., and the hydroxyaryl component that is formed is distilled off. The dicarboxylic acid or dicarboxylic acid mixture is then added in a second stage and the reaction mixture is heated for between 60 and 200 minutes, preferably between 90 and 180 minutes, at a temperature of not higher than 290° C., and condensed to form the polyester carbonate. In each stage the pressure is chosen so that the hydroxyaryl component can be distilled off without any problem.

The polyester carbonate obtained according to the invention is light in color, i.e. it has a color number of <0.2, and contains particularly low amounts of free dicarboxylic acid or anhydride structures and therefore satisfies the formula $$Q = \frac{x + [10(5y + 4z)]^2}{x} < 1.3$$

where
Q: is a characteristic number
x: is the wt. % of the esterified acid in the polyester carbonate
y: is the wt. % of free COOH in the polyester carbonate
z: is the amount, in wt. % of anhydride structural units in the polyester carbonate Suitable dicarboxylic acids for the process according to the invention are those of the formula (I)

$$\text{HOOC—T—COOH} \tag{I}$$

where
T denotes a branched or linear, saturated or unsaturated alkyl, arylalkyl or cycloalkyl radical with 8 to 40 carbon atoms.

Saturated linear alkyl diacids with 8 to 40 carbon atoms are preferred, diacids with 12 to 36 carbon atoms being particularly preferred. Of these classes of substances fatty acids, particularly preferably hydrogenated dimeric fatty acids, are particularly suitable.

Examples of dicarboxylic acids of the formula (I) or mixtures of such fatty acids are:

sebacic acid,
dodecanedioic acid,
stearic acid,
palmitic acid,
hydrogenated dimeric fatty acid, such as for example Pripol 1009 from Uniqema.

Pripol 1009 from Uniqema is a mixture of hydrogenated dimeric fatty acids that according to details given by Uniqema has roughly the following composition:

nated dimerised fatty acids may contain considerable amounts of byproducts that are formed in their production.

The dicarboxylic acids and dihydroxy compounds may be used in the process according to the invention in a molar ratio X:1 therebetween, where $0<X<10$, preferably $0.01<X<1$, particularly preferably $0.02<X<0.5$ and most particularly preferably $0.08<X<0.2$.

The general or preferred definitions of radicals, parameters and/or explanations given above or hereinafter may

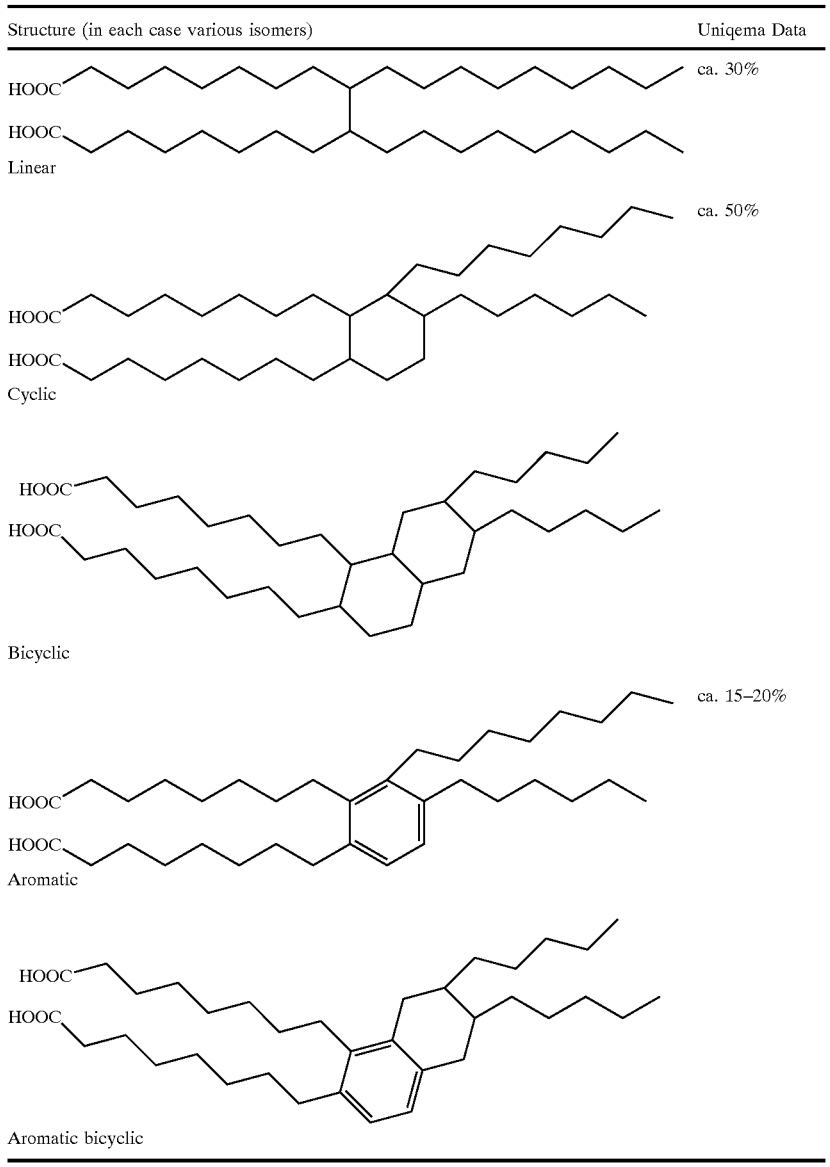

Particularly preferred are dodecanedioic acid and Pripol 1009.

Most particularly preferred is Pripol 1009.

Both a dicarboxylic acid of the formula (I) as well as a plurality of dicarboxylic acids of the formula (I) may be used.

The employed dicarboxylic acids as well as also the other raw materials that are used should of course be as pure as possible. In the case of commercial products the purity often varies greatly however. In particular fatty acids or hydrogealso be arbitrarily combined with one another, i.e. between the respective ranges and preferred ranges. The details apply as appropriate to the end products as well as to the precursors and intermediate products and for processes as well as process stages.

Suitable dihydroxy compounds for the process according to the invention are those of the formula (II)

$$HO-Ar-OH \qquad (II)$$

in which Ar is an aromatic radical with 6 to 30 C atoms, preferably with 6 to 25 C atoms, that may contain one or more aromatic nuclei, may be substituted, and may contain aliphatic or cycloaliphatic radicals or alkylaryl radicals or heteroatoms as bridge members.

Example of dihydroxy compounds of the formula (II) are:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-sulfides,
bis-(hydroxyphenyl)-ethers,
bis-(hydroxyphenyl)-ketones,
bis-(hydroxyphenyl)-sulfones,
bis-(hydroxyphenyl)-sulfoxides,
α,α'-bis-(hydroxyphenyl)-diisopropylbenzenes as well as their nuclear-alkylated and nuclear-halogenated compounds.

These and further suitable other diphenols are described for example in U.S. Pat. Nos. 3,028,365, 3,148,172, 3,275,601, 2,991,273, 3,271,367, 3,062,781, 2,970,131 and 2,999,846, in DE-A 1 570 703, 2 063 050, 2 063 052, 2 211 0956, FR-B 1 561 518 and in the monograph "H. Schnell, Chemistry and Physics of Polycarbonates, Interscience Publishers, New York 1964".

Preferred dihydroxy compounds are for example:
4,4'-dihydroxydiphenyl,
2,2-bis-(4-hydroxyphenyl)-propane,
2,4-bis-(4-hydroxyphenyl)-2-methylbutane,
1,1-bis-(4-hydroxyphenyl)cyclohexane,
1,1-bis-(4-hydroxyphenyl)-4-methylcyclohexane,
α,α'-bis-(4-hydroxyphenyl)-p-diisopropylbenzene,
α,α'-bis-(4-hydroxyphenyl)-m-diisopropylbenzene,
bis-(4-hydroxyphenyl)-sulfone,
bis-(4-hydroxyphenyl)-methane,
1,1-bis-(4-hydroxyphenyl)-3,3,5-trimethylcyclohexane,
bis-(2,6-dimethyl-4-hydroxyphenyl)propane,
bis-(4-hydroxyphenyl)hexafluoropropane,
(4-hydroxyphenyl)-1-phenylethane,
(4-hydroxyphenyl)diphenylmethane,
dihydroxydiphenylether,
4,4'-thiobisphenol,
bis-(4-hydroxyphenyl)-1-(1-naphthyl)ethane,
bis-(4-hydroxyphenyl)-1-(2-naphthyl)ethane,
dihydroxy-3-(4-hydroxyphenyl)-1,1,3-trimethyl-1H-inden-5-ol,
dihydroxy-1-(4-hydroxyphenyl)-1,1,3-trimethyl-1H-inden-5-ol,
2,2',3,3'-tetrahydro-3,3,3',3'-tetramethyl-1,1'-spirobi[1H-indene]-5,5'-diol.

Particularly preferred are:
resorcinol,
bis-(4-hydroxyphenyl)-1-(1-naphthyl)ethane,
bis-(4-hydroxyphenyl)-1-(2-naphthyl)ethane,
2,2-bis-(4-hydroxyphenyl)-propane,
α,α'-bis-(4-hydroxyphenyl)-p-diisopropylbenzene,
α,α'-bis-(4-hydroxyphenyl)-m-diisopropylbenzene,
1,1-bis-(4-hydroxyphenyl)cyclohexane,
bis-(4-hydroxyphenyl)-3,3,5-trimethylcyclohexane,
bis-(4-hydroxyphenyl)diphenylmethane.

Most particularly preferred are:
bis-(4-hydroxyphenyl)-3,3,5-trimethylcyclohexane,
4,4'-dihydroxydiphenyl,
2,2-bis-(4-hydroxyphenyl)propane.

Most preferred of all is bis-(4-hydroxyphenyl)-3,3,5-trimethylcyclohexane.

Both a diphenol of the formula (II) as well as a plurality of diphenols of the formula (II) may be used.

Diaryl carbonates within the context of the present invention are those carbonic acid diesters of the formula (III)

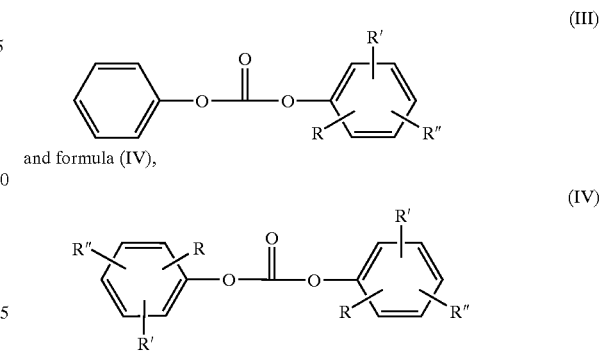

and formula (IV), wherein R, R' and R" may denote independently of one another H, optionally branched $C_1$–$C_{34}$ alkyl/cycloalkyl, $C_7$–$C_{34}$ alkylaryl or $C_6$–$C_{34}$ aryl, for example
diphenyl carbonate,
butylphenyl-phenyl carbonate, di-butylphenyl carbonate,
isobutylphenyl-phenyl carbonate, di-isobutylphenyl carbonate,
tert.-butylphenyl-phenyl carbonate, di-tert.-butylphenyl carbonate,
n-pentylphenyl-phenyl carbonate, di-(n-pentylphenyl) carbonate,
n-hexylphenyl-phenyl carbonate, di-(n-hexylphenyl) carbonate,
cyclohexylphenyl-phenyl carbonate, di-cyclohexylphenyl carbonate,
phenylphenol-phenyl carbonate, di-phenylphenol carbonate,
isooctylphenyl-phenyl carbonate, di-isooctylphenyl carbonate,
n-nonylphenyl-phenyl carbonate, di-(n-nonylphenyl) carbonate,
cumylphenyl-phenyl carbonate, di-cumylphenyl carbonate,
naphthylphenyl-phenyl carbonate, di-naphthylphenyl carbonate,
di-tert.-butylphenyl-phenyl carbonate, di-(di-tert.-butylphenyl) carbonate,
dicumylphenyl-phenyl carbonate, di-(dicumylphenyl) carbonate,
4-phenoxyphenyl-phenyl carbonate, di-(4-phenoxyphenyl) carbonate,
3-pentadecylphenyl-phenyl carbonate, di-(3-pentadecylphenyl) carbonate,
tritylphenyl-phenyl carbonate, di-tritylphenyl carbonate,
preferably
diphenyl carbonate,
tert.-butylphenyl-phenyl carbonate, di-tert.-butylphenyl carbonate,
phenylphenol-phenyl carbonate, di-phenylphenol carbonate,
cumylphenyl-phenyl carbonate, di-cumylphenyl carbonate,
particularly preferably diphenyl carbonate.

Furthermore, the phenolic compounds used as carbonates may also be used directly as hydroxyaryl compounds in addition to one of the aforementioned carbonates, in order to influence the terminal group of the polyester carbonates. Preferred mixtures are those containing diphenyl carbonate. According to the process of the invention it is possible to add the hydroxyaryl compound or the hydroxyaryl-containing compound at any time to the reaction mixture, preferably at the start of the reaction, and to split the addition into several portions. The proportion of free hydroxyaryl may be 0.4 to 17 mole %, preferably 1.3 to 8.6 mole % (referred to the dihydroxy compound). In this connection the addition may take place both before the reaction as well as wholly or partially during the reaction.

The carbonic acid diesters are used in a ratio of 1:0.9 to 1:1.3, preferably 1:1.0 to 1:1.2, particularly preferably 1:1.0 to 1:1.1, referred to the total of dihydroxy compound and dicarboxylic acid. Mixtures of the aforementioned carbonic acid diesters or dicarboxylic acids may also be used.

Ammonium compounds or phosphonium compounds may be used as catalysts for the synthesis, and are preferably used in amounts of 0.0001 to 0.5 mole %, referred to the total of dicarboxylic acid and dihydroxy compound, particularly preferably in amounts of 0.001 to 0.2 mole %.

Phosphonium salts, optionally in combination with other suitable catalysts that do not lead to a more intense intrinsic color, are preferably used as catalyst for the production of the polyester carbonates according to the invention.

Phosphonium salts within the context of the present invention are those of the formula (V)

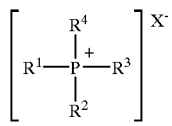

wherein $R^{1-4}$ may denote the same or different $C_1$–$C_{10}$ alkyl, $C_6$–$C_{10}$ aryl, $C_7$–$C_{10}$ aralkyl or $C_5$–$C_6$ cycloalkyl radicals, preferably methyl or $C_6$–$C_{14}$ aryl radicals, particularly preferably methyl or phenyl, and $X^-$ may be an anion such as hydroxide, sulfate, hydrogen sulfate, hydrogen carbonate, carbonate, a halide, preferably chloride, or an alcoholate of the formula OR in which R may be $C_6$–$C_{14}$ aryl or $C_7$–$C_{12}$ aralkyl, preferably phenyl.

Preferred catalysts are
tetraphenylphosphonium chloride,
tetraphenylphosphonium hydroxide,
tetraphenylphosphonium phenolate,
particularly preferably tetraphenylphosphonium phenolate.

The polyester carbonates may be intentionally branched and may therefore contain minor amounts of 0.02 to 3.6 mole % (referred to the total of dicarboxylic acid and dihydroxy compound) of branching agents. Appropriate branching agents are those compounds suitable for the polycarbonate production and containing three or more functional groups, preferably those with three or more than three phenolic OH groups, for example 1,1,1,-tri(4-hydroxyphenyl)ethane and isatin biscresol.

In order to change the properties auxiliary substances and reinforcing agents may be added to the polyester carbonates according to the invention. Such known substances and agents include, inter alia, thermostabilizers and UV stabilizers, flow auxiliaries, mold release agents, flame-proofing agents, pigments, finely divided minerals, fibrous substances, e.g. alkyl and aryl phosphites, phosphates, phosphanes, low molecular weight carboxylic acid esters, halogen compounds, salts, chalk, quartz flour, glass fibers and carbon fibers, pigments and combinations thereof. Such compounds are described for example in WO 99/55772 pp. 15–25, and in "Plastics Additives", R. Gächter and H. M üller, Hanser Publishers 1983.

In addition other polymers may also be added to the polyester carbonates according to the invention, for example polyolefins, polyurethanes, polyesters, acrylonitrile/butadiene/styrene, and polystyrene.

These substances are preferably added to the ready-for-use polyester carbonate in conventional equipment, but depending on requirements may however also be added at another stage of the production process.

The polyester carbonates obtainable by the process according to the invention may be processed in the usual way in conventional machinery, for example in extruders or injection molding machines, into arbitrary molded articles, for example into films or sheets.

In addition to the use of the polyester carbonates and/or the corresponding molding compositions according to the invention for the production of molded parts and extrudates, the present invention also provides in particular optical articles, sheets and films and/or the corresponding molded parts, preferably optical articles, produced from the polyester carbonates according to the invention.

Examples of this use, which however should not be regarded as limiting, include:

1. Safety/security panels that, as is known, are required in many areas of buildings, vehicles and aircraft, as well as shields for helmets.
2. Production of extrusion sheets and solution sheets for displays or electrical motors, as well as sheet material for skis.
3. Production of transparent panels, in particular hollow chamber panels, for example for covering buildings such as stations, greenhouses and lighting installations.
4. For the production of traffic signal housings or road signs.
5. As translucent plastics containing glass fibers, optionally for light technology purposes (see for example DE-OS 1 554 020).
6. For the production of precision injection molded parts.
7. Optical applications, such as optical storage media (CD, DVD, MD), protective goggles or lenses for photographic cameras and film cameras (see for example DE-OS 2 701 173).
8. For socket housings as well as plug-type connectors.
9. As support material for organic photoconductors.
10. For the production of lights, e.g. vehicle headlamps, diffuse lighting panels or lamp covers.
11. For medical applications, e.g. oxygenators, dialysers.
12. For foodstuffs applications.
13. For uses in the automobile sector.
14. For sports articles.
15. For household articles, such as for example sink units and letterbox housings.
16. For housings, such as e.g. electrical distribution panels, electrical appliances, domestic appliances.
17. Construction parts of household articles, electrical appliances and electronic equipment.
18. For the production of motorcycle helmets and protective helmets.
19. For miscellaneous applications, such as e.g. stall-feeding doors or animal cages.

The polyester carbonates according to the invention are most particularly suitable for the production of optical and magnetooptical articles, in particular data storage media such as CD, DVD, MD and their derivatives, i.e. writeable and rewriteable data carriers, e.g. CD-ROM, CD-R, CD-RW, DVD-ROM, HD-DVD, etc.

EXAMPLES

The relative solution viscosity was measured at 25° C. in dichloromethane at a concentration of 5 g/l.

The content of phenolic OH is obtained by IR measurements. For this purpose a differential measurement of a solution of 2 g of polymer in 50 ml of dichloromethane compared to pure dichloromethane is made and the extinction difference is determined at 3582 $cm^{-1}$.

The content in wt. % of esterified acid (x) in the polyester carbonate is measured using a solution of 1 g of polyester carbonate in 100 ml of dichloromethane. For this purpose an IR spectrum of the solution is recorded and evaluated according to the PLS method. The spectral ranges 1919–1581 cm$^{-1}$ as well as 2739–2894 cm$^{-1}$ are used for the PLS evaluation. The calibration was performed with 29 samples of known composition.

The determination of the free carboxylic acid groups in the polyester carbonate (y) was likewise carried out by IR spectroscopy on the above solution. Spectra of dichloromethane, water vapour and an acid-free and anhydride-free polyester carbonate with 20 wt. % Pripol were subtracted and the extinction difference was evaluated at 1709 cm$^{-1}$. The measurement was calibrated on polyester carbonates with various Pripol contents. Values of <0.01 were counted as zero.

The determination of the anhydride structure (z) was carried out on the basis of the above IR spectrum by evaluating the extinction at 1816 cm$^{-1}$ minus the extinction at 1860 cm$^{-1}$ as well as a contribution of 0.031. The method is uncalibrated.

The color number was determined as the difference of the extinction at 420 nm and 700 nm in dichloromethane at a concentration of 2.4 g/50 ml and a layer thickness of 10 cm.

Example 1

53.94 g (0.174 mole) of bisphenol TMC, 45.41 g (0.212 mole) of diphenyl carbonate and 0.0494 g ($8\times10^{-5}$ mole) of tetraphenylphosphonium phenolate (metered in as mixed crystals with 30 wt. % of phenol referred to the mixed crystals) were weighed out in a 500 ml three-necked flask equipped with stirrer, internal thermometer and Vigreux column (30 cm, mirror-coated) with bridge. The apparatus is freed from atmospheric oxygen by applying a vacuum and purged with nitrogen (three times) and the mixture is melted at 150° C. and 100 mbar. The temperature is raised to 190° C. and the phenol formed is distilled off over 30 minutes. The temperature is now increased to 235° C., after 15 minutes the vacuum is adjusted to 60 mbar, and after a further 15 minutes the temperature is adjusted to 250° C. After another 15 minutes the temperature is raised to 280° C. and 14.63 g (0.026 mole) of Pripol 1009 are added and the mixture is stirred for one hour. The vacuum is then reduced to 0.5 mbar and the mixture is stirred for a further 120 minutes. The results are summarised in Table 1.

Example 2

1078.80 g (3.48 moles) of bisphenol TMC, 891.16 g (4.16 moles) of diphenyl carbonate and 0.9874 g ($1.6\times10^{-3}$ mole) of tetraphenylphosphonium phenolate (metered in as mixed crystals with 30 wt. % of phenol referred to the mixed crystals) are weighed out in a stirred vessel. The vessel is freed from atmospheric oxygen by applying a vacuum and purged with nitrogen (three times) and the mixture is melted at 150° C. and 100 mbar. The temperature is raised to 190° C. and the phenol formed is distilled off over 60 minutes. The temperature is now increased to 235° C., after 15 minutes the vacuum is adjusted to 60 mbar, and after a further 15 minutes the temperature is adjusted to 250° C. After another 15 minutes the temperature is raised to 280° C. and 292.50 g (0.52 mole) of Pripol 1009 are added and the mixture is stirred for one hour. The vacuum is then reduced to 0.5 mbar and the mixture is stirred for a further 75 minutes. The results are summarised in Table 1.

Example 3

1078.80 g (3.48 moles) of bisphenol TMC, 891.16 g (4.16 moles) of diphenyl carbonate and 0.2469 g ($4\times10^{-4}$ mole) of tetraphenylphosphonium phenolate (metered in as mixed crystals with 30 wt. % of phenol referred to the mixed crystals) are weighed out in a stirred vessel. The vessel is freed from atmospheric oxygen by applying a vacuum and purging with nitrogen (three times) and the mixture is melted at 150° C. The temperature is raised to 190° C. and the phenol formed is distilled off over 60 minutes. The temperature is now increased to 235° C., after 15 minutes the vacuum is adjusted to 60 mbar, and after a further 15 minutes the temperature is adjusted to 250° C. After another 15 minutes the temperature is raised to 280° C. and 292.50 g (0.52 mole) of Pripol 1009 are added and the mixture is stirred for one hour. The vacuum is then reduced to 0.5 mbar and the mixture is stirred for a further 120 minutes. The results are summarised in Table 1.

Example 4

53.94 g (0.174 mole) of bisphenol TMC, 45.84 g (0.214 mole) of diphenyl carbonate and 0.0494 g ($8\times10^{-5}$ mole) of tetraphenylphosphonium phenolate (metered in as mixed crystals with 30 wt. % of phenol referred to the mixed crystals) are weighed out in a 500 ml three-necked flask equipped with stirrer, internal thermometer and Vigreux column (30 cm, mirror-coated) with bridge. The apparatus is freed from atmospheric oxygen by applying a vacuum and purging with nitrogen (three times) and the mixture is melted at 150° C. and 100 mbar. The temperature is raised to 190° C. and the phenol formed is distilled off over 30 minutes. The temperature is now increased to 235° C., after 15 minutes the vacuum is adjusted to 60 mbar, and after a further 15 minutes the temperature is adjusted to 250° C. After another 15 minutes the temperature is raised to 280° C. and 5.99 g (0.026 mole) of dodecanedioic acid are added and the mixture is stirred for one hour. The vacuum is then reduced to 0.5 mbar and the mixture is stirred for a further 60 minutes. The results are summarised in Table 1.

Example 5

41.094 g (0.180 mole) of bisphenol A, 44.99 g (0.210 mole) of diphenyl carbonate and 0.0049 g ($8\times10^{-6}$ mole) of tetraphenylphosphonium phenolate (metered in as mixed crystals with 30 wt. % of phenol referred to the mixed crystals) are weighed out in a 500 ml three-necked flask equipped with stirrer, internal thermometer and Vigreux column (30 cm, mirror-coated) with bridge. The apparatus is freed from atmospheric oxygen by applying a vacuum and purging with nitrogen (three times) and the mixture is melted at 150° C. The temperature is raised to 190° C. and the mixture is stirred for 30 minutes. The phenol formed is then distilled off at 100 mbar over 20 minutes. The temperature is now increased to 235° C., after 15 minutes the vacuum is adjusted to 60 mbar, and after a further 15 minutes the temperature is adjusted to 250° C. After another 15 minutes 4.61 g (0.02 mole) of dodecanedioic acid are added. After 15 minutes at 60 mbar the vacuum is adjusted to 5 mbar and after 30 minutes is raised to a high vacuum. After a further 15 minutes the temperature is increased to 260° C. and the mixture is stirred for 30 minutes. The results are summarised in Table 1.

Comparison Example 1

1078.80 g (3.48 moles) of bisphenol TMC, 908.29 g (4.24 moles) of diphenyl carbonate and 0.9874 g ($1.6\times10^{-3}$ mole) of tetraphenylphosphonium phenolate (metered in as mixed crystals with 30 wt. % of phenol referred to the mixed crystals) are weighed out into a stirred vessel. The vessel is freed from atmospheric oxygen by applying a vacuum and purging with nitrogen (three times) and the mixture is melted at 150° C. and 100 mbar. The temperature is raised to 190° C. and the phenol formed is distilled off over 60 minutes. The temperature is now increased to 235° C., after 30 minutes the vacuum is increased to 60 mbar, and 292.50 g (0.52 mole) of Pripol 1009 are added. After a further 15 minutes the temperature is adjusted to 250° C. and the vacuum is then adjusted to 5 mbar. After another 15 minutes the temperature is raised to 280° C. and after 15 minutes the vacuum is adjusted to 0.5 mbar, following which the temperature is adjusted to 300° C. and the mixture is stirred for a further 90 minutes. The results are summarised in Table 1.

Comparison Example 2

1078.80 g (3.48 moles) of bisphenol TMC, 908.29 g (4.24 moles) of diphenyl carbonate and 0.2469 g ($4\times10^{-4}$ mole) of tetraphenylphosphonium phenolate (metered in as mixed crystals with 30 wt. % of phenol referred to the mixed crystals) are weighed out into a stirred vessel. The vessel is freed from atmospheric oxygen by applying a vacuum and purging with nitrogen (three times) and the mixture is melted at 150° C. and 100 mbar. The temperature is raised to 190° C. and the phenol formed is distilled off over 60 minutes. The temperature is now increased to 235° C., 292.50 g (0.52 mole) of Pripol 1009 are added, and after 30 minutes the vacuum is increased to 60 mbar. After 15 minutes the temperature is adjusted to 250° C. and after a further 15 minutes the vacuum is slowly adjusted to 5 mbar, as well as the temperature to 280° C. A vacuum of 1 mbar is then applied, the temperature is adjusted to 300° C., and the mixture is stirred for a further 90 minutes. The results are summarised in Table 1.

Comparison Example 3

53.94 g (0.174 mole) of bisphenol TMC, 45.84 g (0.214 mole) of diphenyl carbonate, 5.99 g (0.026 mole) of dodecanedioic acid and 0.0494 g ($8\times10^{-5}$ mole) of tetraphenylphosphonium phenolate (metered in as mixed crystals with 30 wt. % of phenol referred to the mixed crystals) are weighed out in a 500 ml three-necked flask equipped with stirrer, internal thermometer and Vigreux column (30 cm, mirror-coated) with bridge. The apparatus is freed from atmospheric oxygen by applying a vacuum and purging with nitrogen (three times) and the mixture is melted at 150° C. The temperature is raised to 190° C. and the phenol formed is distilled off over 30 minutes. A vacuum of 100 mbar is now applied, and after 20 minutes the temperature is raised to 235° C. After 15 minutes the vacuum is adjusted to 60 mbar and after a further 15 minutes the temperature is adjusted to 250° C. After another 15 minutes the vacuum is raised to 5 mbar and after a further 15 minutes the temperature is raised to 280° C. After 15 minutes the vacuum is adjusted to 0.5 mbar, and after a further 15 minutes the temperature is raised to 300° C. and the mixture is stirred for a further 30 minutes. The results are summarised in Table 1.

Comparison Example 4

41.09 g (0.180 mole) of bisphenol A, 49.27 g (0.23 mole) of diphenyl carbonate, 4.61 g (0.02 mole) of dodecanedioic acid and 0.1225 g ($2\times10^{-6}$ mole) of tetraphenylphosphonium phenolate (metered in as mixed crystals with 30 wt. % of phenol referred to the mixed crystals) are weighed out in a 500 ml three-necked flask equipped with stirrer, internal thermometer and Vigreux column (30 cm, mirror-coated) with bridge. The apparatus is freed from atmospheric oxygen by applying a vacuum and rinsing with nitrogen (three times) and the mixture is melted at 150° C. The temperature is raised to 190° C. and the mixture is stirred for 30 minutes. The phenol that is formed is then distilled off at 100 mbar over 20 minutes. The temperature is now raised to 235° C., after 15 minutes the vacuum is adjusted to 60 mbar, and after a further 15 minutes the temperature is adjusted to 250° C. After another 15 minutes the vacuum is adjusted to 5 mbar and after a further 15 minutes the temperature is raised to 300° C. After a further 15 minutes the vacuum is adjusted to 0.5 mbar, and 15 minutes later the temperature is raised to 300° C. and the mixture is stirred for 30 minutes. The results are summarised in Table 1.

Comparison Example 5

30 g of dichloromethane and 40 g of water are placed in a 2000 ml three-necked flask equipped with stirrer, thermometer and reflux condenser. A solution 1 of 81 g of TMC bisphenol in 400 g of water and 59 g of 49% NaOH, a solution 2 of 22 g of dimeric fatty acid and 60 g of phosgene in 520 g of dichloromethane and a solution 3 of 1.35 g of p-tert. butylphenol and 0.34 g of ethylpiperidine in 70 g of dichloromethane are all metered in at the same time over 10 minutes into the solution contained in the flask. An alkaline pH of >11 is adjusted by the simultaneous addition of 210 g of 25% NaOH. After the end of the additions the mixture is stirred for a further 15 minutes to complete the reaction. The organic phase is then separated, and is next washed with dilute acid and then with demineralised water until the wash phases are almost free of electrolyte. The organic phase is concentrated by evaporation and is dried in a water jet vacuum for 16 hours at 80° C. in a vacuum drying cabinet.

TABLE 1

| Ex. | Eta rel. | Color No. | % OH | x | y | z | Q |
|---|---|---|---|---|---|---|---|
| Ex. 1 | 1.175 | 0.166 | 0.021 | 19.7 | 0 | 0 | 1 |
| Ex. 2 | 1.179 | 0.157 | 0.036 | 18.8 | 0 | 0 | 1 |
| Ex. 3 | 1.170 | 0.139 | 0.020 | 19.3 | 0 | 0 | 1 |
| Ex. 4 | 1.172 | 0.089 | 0.037 | 8.8 | 0 | 0 | 1 |
| Ex. 5 | 1.210 | 0.051 | 0.075 | 7.7 | 0 | 0 | 1 |
| Comp. Ex. 1 | 1.183 | 0.522 | 0.006 | 18.6 | 0 | 0 | 1 |
| Comp. Ex. 2 | 1.179 | 0.455 | 0.012 | 18.2 | 0 | 0 | 1 |
| Comp. Ex. 3 | 1.150 | 0.205 | 0.007 | 8.4 | 0 | 0 | 1 |
| Comp. Ex. 4 | 1.227 | 1.000 | 0.006 | 9.1 | 0 | 0 | 1 |
| Comp. Ex. 5 | 1.186 |  | 0.073 | 19.0 | 0.04 | 0.015 | 1.4 |

The examples clearly demonstrate the surprising superiority of the polyester carbonates according to the invention, which with the same Q number have a color number that is clearly superior compared to that of polyester carbonates produced according to conventional esterification processes (i.e. all educts are simultaneously reacted with one another and/or heated to 300° C. in one step).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A transesterification process for producing polyester comprising in a first stage heating to a temperature of 200 to 290° C., in an inert gas atmosphere for about 30 to 300 minutes, a first mixture containing at least one dihydroxy compound and at least one diaryl carbonate to form an oligocondensate, and in a second stage adding to said oligocondensate at least one dicarboxylic acid to form a second mixture therewith and heating the second mixture for 60 to 200 minutes at a temperature not higher than 290° C. in the presence of a quaternary onium compound as catalyst to form polyester carbonate, and distilling-off under reduced pressure the hydroxyaryl formed throughout said process.

2. The process of claim 1 wherein heating in said first stage is for about 40 to 150 minutes.

3. The process of claim 1 wherein heating in said first stage is to a temperature of 230 to 290° C.

4. The process of claim 1 wherein heating in said first stage is to a temperature of 250° to 280° C.

5. The process of claim 1 wherein heating in said second stage is for 90 to 180 minutes.

6. The process of claim 1 wherein quaternary onium is phosphonium.

7. A transesterification process for producing polyester comprising in a first stage heating to a temperature of 200 to 290° C., in an inert gas atmosphere for about 30 to 300 minutes, a first mixture containing at least one dihydroxy compound and at least one diaryl carbonate to form an oligocondensate, and in a second stage adding to said oligocondensate at least one dicarboxylic acid to form a second mixture therewith and heating the second mixture for 60 to 200 minutes at a temperature not higher than 290° C. in the presence of a tetraphenylphosphonium phenolate as catalyst to form polyester carbonate, and distilling-off under reduced pressure the hydroxyaryl formed throughout said process.

8. The process of claim 1 wherein the catalyst is present in an mount of 0.0001 to 0.5 mol %, relative to the total molar sum of dicarboxylic acid and dihydroxy compound.

9. The Polyester carbonate prepared by the process of claim 1.

10. Polyester carbonate characterized in having a color number of <0.2 and a characteristic number, Q, lower than 1.3 wherein $$Q = \frac{x + [10(5y + 4z)]^2}{x}$$

and x is the wt. % of esterified acid in the polyester carbonate, y is the wt. % of free COOH in the polyester carbonate and z is the amount, in wt. % of anhydride structural units in the polyester carbonate.

11. A method of using the polyester carbonates of claim 9 comprising producing molding compositions.

12. A molded article comprising the polyester carbonate of claim 9.

* * * * *